Dec. 2, 1930.  A. M. MEARS  1,783,741
CLUTCH MECHANISM
Filed Feb. 16, 1927  2 Sheets-Sheet 1
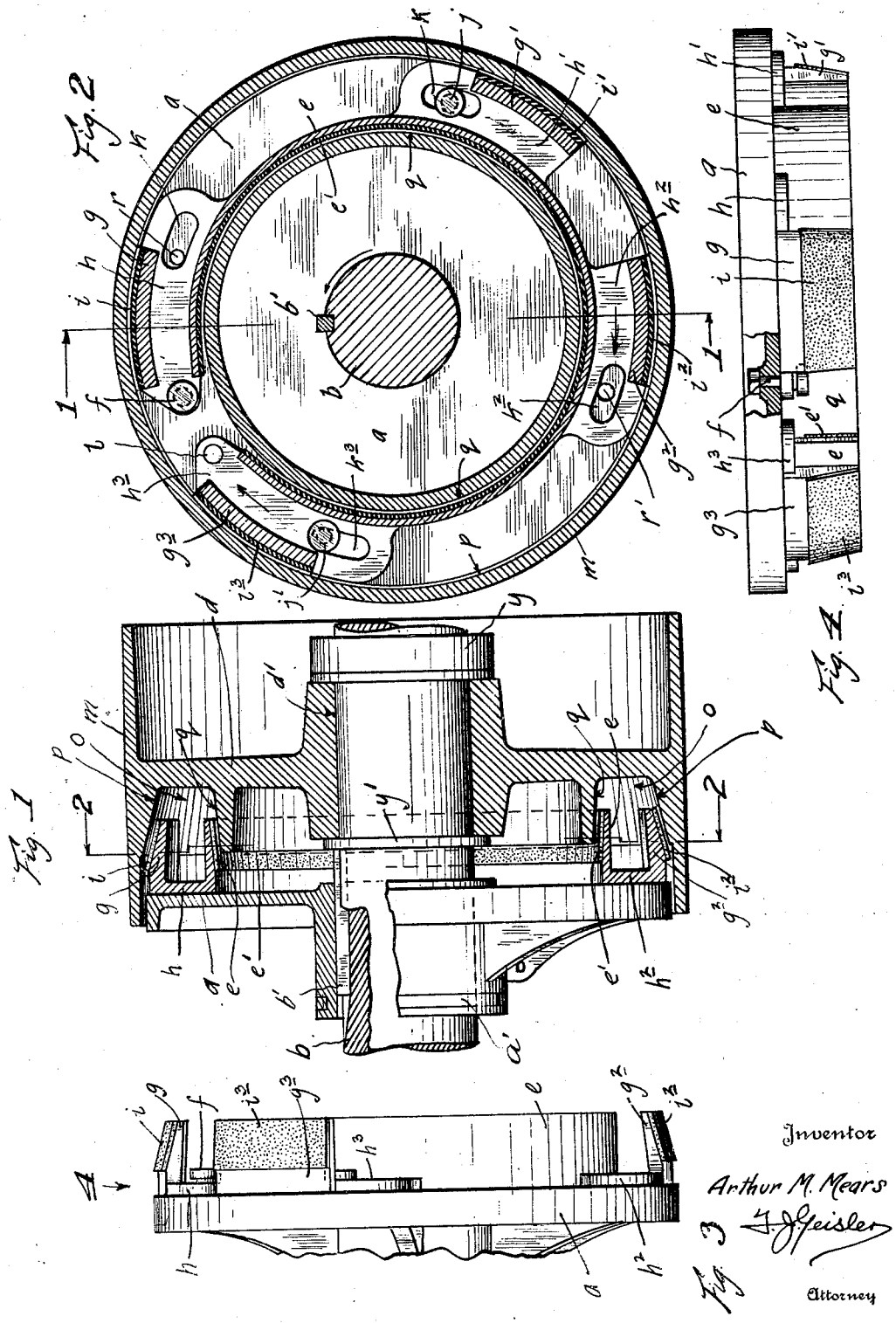
Inventor
Arthur M. Mears
by
Attorney

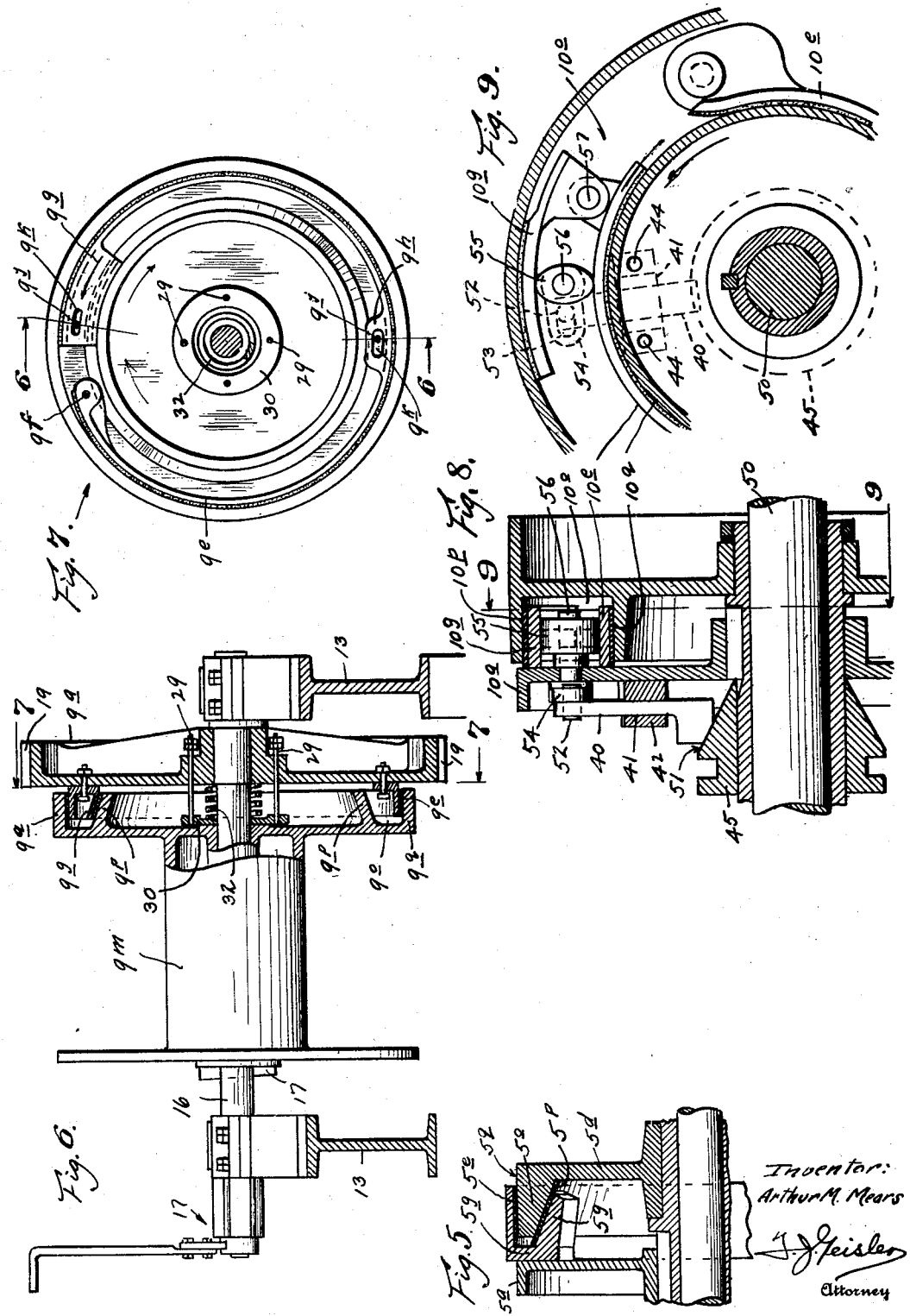

Patented Dec. 2, 1930

1,783,741

UNITED STATES PATENT OFFICE

ARTHUR M. MEARS, OF PORTLAND, OREGON

CLUTCH MECHANISM

Application filed February 16, 1927. Serial No. 168,661.

My invention relates to motion transmitting mechanism, particularly to friction clutches designed for heavy duty and comprising two clutch members carried by a shaft, one loose, the other fast, and means for engaging said members with each other.

Friction clutches in hoisting drums and other devices designed for heavy duty require the clutch members to be engaged by pressure of considerable force. With heavy loads the force required is frequently too great for convenient manual operation; that is, the strength of the operator is often inadequate to engage the clutch members properly, which tends to cause repairs, replacements, and loss of power.

When a thrust pin is employed, which is thrust against a center key by a thrust screw, the wear between these parts is rapid, often the friction between them tends to draw their temper, and sometimes even fuses the parts together.

Also, where the clutch required is too large for convenient manual operation, power operation is sometimes applied. This is, however, very expensive and does not give the operator sufficient control of the clutch. For some operations the clutch engagement should be such as to permit some slip if desired which, however, is not readily obtainable except by manual control of the clutch. For instance, in the use of a clutch in connection with a donkey engine in logging operations, it frequently happens that the log being hauled in strikes an obstruction, and considerable damage would ensue unless the pull on the cable can be instantly eased. Hence, for quick and accurate handling of clutch mechanism, manual operation is desirable.

The object of my invention is to provide a clutch mechanism, capable of performing heavy duty, but requiring only a relatively light pressure for operation so that the clutch mechanism may be conveniently operated manually.

A further object of my invention is to provide a clutch mechanism which due to the relatively light thrust required, will provide a satisfactory modicum of "slip" that is, in case the load on the clutch is suddenly increased, my clutch will slip and relieve the strain until the operator has had time to disengage the clutch mechanism.

A clutch of the friction-band type is very effective, provided simple and efficient operating means are provided in combination therewith; but such operating means have, in my judgment, not heretofore been provided.

I have discovered that a very superior and efficient clutch mechanism is obtained by the combination of a primary clutch of the friction-band type with a secondary clutch, the latter functioning to throw the primary clutch into action; and the object of my invention is to provide efficient motion transmitting mechanism operating upon the principle of such invention.

One embodiment of my invention consists in the combination of a primary clutch of the friction-band type with a secondary clutch of the cone type, the latter operating to place the friction-band in its active position.

The secondary clutch is first applied by the application of a thrust thereon, and is, by itself, capable of effecting an efficient engagement of the clutch discs or members carried by the shaft, provided the force of the thrust be proportional to the load which the clutch must carry. But by my invention the primary friction-band clutch is primarily depended upon to effect the load carrying engagement, and such engagement is effected by the application of the secondary clutch with only a fractional part of the force ordinarily required for properly engaging the secondary cone clutch when used by itself.

I attain my object by providing one of the clutch members carried by the shaft with a friction surface concentric with the axis of the shaft; the friction-band is secured at one end to the other member, and is arranged for engagement with said friction surface, but normally is spaced therefrom; and the secondary clutch is connected to the free end of the friction-band; whereby when the secondary clutch is thrown into action the friction-band is placed in its active position, and the drag of the friction-band on the friction surface tends to engage the clutch members more and more intensively as the load increases.

Instead of employing a secondary clutch of the cone type, it will be sufficient for some purposes to employ a friction clutch consisting of two elements, one of which is connected to the free end of the friction-band, and said elements being adapted to be engaged by the pressure of one on the other.

The secondary friction clutch may consist of shoes or any other convenient means secured to the free end of said friction band, and adapted when engaged to cause the contraction, or expansion of the circle described by the friction-band—according to the specific arrangement of my mechanism, and thus cause the friction-band to have a friction drag on the friction surface along which it lies; at the same time, the friction-band is readily released by the mere retraction of the movable clutch member, incidental to the release of the secondary clutch.

The friction surface with which the friction-band is engaged may be given more or less of a slant, so as to facilitate the application, and especially the disengagement of my clutch.

Various other modifications of my invention, but within the principle thereof may suggest themselves.

While I have described my invention as applicable particularly to clutch mechanism, it is also applicable to brake mechanism, and other similar devices.

The practical embodiment of my invention in an operating device, showing details of construction which I found convenient to employ, and illustrating the mode of operation, are hereinafter fully described with reference to the accompanying drawings.

In the drawings:

Fig. 1 shows a sectional view taken on the line 1—1 of Fig. 2 looking in the direction of the arrows, and illustrates the two clutch members in a disengaged position;

Fig. 2 shows a section taken on the line 2—2 of Fig. 1, looking in the direction of the arrows, and illustrates the arrangement of the groove and the friction member carried thereby in one embodiment of my invention;

Fig. 3 shows a fragmentary elevation of the driving clutch member removed from the shaft to illustrate details of construction;

Fig. 4 shows a view looking down in the direction of the arrow 4 on the driving clutch member shown in Fig. 3, with parts broken away to disclose the means by which one end of the friction-band is secured to the said driving-clutch member;

Fig. 5 shows a fragmentary longitudinal section illustrating a modification of my clutch mechanism;

Fig. 6 shows a side elevation of a hoisting drum; my clutch being shown in a section taken on the line 6—6 of Fig. 7, looking in the direction of the arrows, and illustrates the details of construction where the friction-band of my clutch is adapted to be expanded when in its active position;

Fig. 7 shows a section taken on the line 7—7 of Fig. 6, looking in the direction of the arrows, and illustrates further details of construction;

Fig. 8 shows a fragmentary longitudinal section of my clutch mechanism and illustrates a particular type of engaging means; and Fig. 9 shows a section taken on the line 9—9 of Fig. 8 looking in the direction of the arrows, and illustrates the details of construction of the latter engaging means.

My clutch mechanism comprises, as illustrated by Figs. 1 to 4 inclusive, a driving-clutch member $a$ fastened on the shaft $b$ and adapted for longitudinal movement thereon by a feather-key $b'$; and a driven clutch member $d$ free to rotate on the shaft $b$ as at $d'$ and held in place by a thrust collar $y$ and a retaining collar $y'$ and a channel $a'$ is provided in the hub of the driving member $a$, for coaction with suitable shifting means, not shown.

A friction-band $e$ is connected to the driving clutch member $a$ at one end by a bolt $f$, Figs. 2, 3 and 4, and is provided with a friction surface $e'$ and to the free end of this friction band is fastened a friction shoe as shown by $h3$. If preferred a series of spaced friction shoes $g$, $g'$ $g2$ and $g3$ are fastened to the friction-band $e$ by perpendicular supports $h$, $h'$ $h2$ and $h3$ and said friction shoes are transversely slanting and are provided with friction surfaces $i$, $i'$, $i2$ and $i3$.

The perpendicular supports $h$, $h'$, $h2$ and $h3$ of the friction shoes are provided with slots $k$, $k'$, $k2$ and $k3$ in which studs $j$ and $j'$ on the driving clutch member are seated in slots $k'$ and $k3$ and holes $r$ and $r'$ in the driving clutch member are provided adjacent the slots $k$ and $k2$ in which studs similar to studs $j$ and $j'$ may be inserted and a hole $l$ is provided in the free end of the friction shoe $g3$ for convenience, if desirable to reverse the direction of the clutching action.

The driven clutch member $d$ comprises a pulley $m$ and is provided with an annular groove $o$ in which the friction-band $e$ and the friction shoes will operate. The outer side $p$ of the annular groove is transversely slanting or conical and adapted to engage the transversely slanting or conical sides of the friction shoes. The inner side $q$ of the said groove may be perpendicular or slightly slanting as in Fig. 1, when easier disengagement of the clutch is required.

My clutch operates as follows: As the driving member $a$ is forced, by any suitable means, against the driven member $b$, the friction shoes $g$, $g'$ $g2$ and $g3$ will engage with the lateral annular face p of the driven member d, and the friction band e will be drawn more and more tightly around the lateral surface q of said driven member. This causes a frictional drag of the free end of the friction band along substantially its entire length upon the said surface q; and since the latter has a tendency to lag behind the driving member a, the said frictional drag increases in intensity until an efficient driving engagement is effected between the said clutch members.

It is to be noted that I do not depend upon the friction shoe element to effect the engagement of the clutch members; instead I depend on the circumferential drag of the friction band e upon the lateral surface q of the driven member. The clutching action of the friction shoe element is employed only to cause the friction band e to tighten its wrap about the said lateral surface. Only a relatively small amount of external force is required to throw my clutch into action, and it is as readily thrown out of action.

The amount of external force required varies with the angle of the sides p and q, but is only a fraction of the external force required in a cone clutch of equal capacity, or if the action of the friction shoes alone were relied upon.

Referring now to Fig. 5, I have shown a modification of my clutch mechanism, in which I adapt the friction-band 5e to engage the outer face 5q of the flange 5° of the driven member 5d. The friction-band 5e is otherwise similar to the friction-band e, shown in the previously described form of my clutch mechanism, Figs. 1 to 4. The friction-band 5e is provided with friction shoes 5g, formed with interior conical or transversely slanting friction surfaces which bear against the inner face 5p of the flange 5°.

The above modification of my clutch mechanism is especially adapted for use where the size, that is the diameter of the clutch, is restricted by mechanical considerations, since this modification obtains a larger radius for the friction-band within the same space as the other forms of my clutch mechanism.

In operation the above modification of my clutch mechanism is the same in every respect as that described with reference to Figs. 1 to 4.

Referring now to Figs. 6 and 7 I show a modification of my clutch mechanism in which my clutch mechanism functions on the principle of an expanding friction-band, as hereinafter described. I also show this modification of my clutch mechanism adapted to a hoisting drum 9m which is mounted for rotation on a shaft 16 which is journaled on supports 13 and provided with an engaging mechanism 17. On one end of the shaft 16 is fixed a driving member 9a provided with gear teeth 19, which rotates with the shaft.

To the driving member 9a, is fixed at one end as at 9f, a friction-band 9e on the free end of which is provided on its inner side a friction shoe 9g formed with a transversely slanting or conical face, and the drum 9m is provided with an annular groove 9o formed with its outer side 9q perpendicular, and its inner side 9p transversely slanting and thus the annular groove 9o is adapted to receive the friction-band 9e and the friction shoe 9g.

Adjacent the shaft 16 are a number of parallel bolts 29 loosely mounted in the driving member and fixed on their other ends is a circular disc 30 mounted over the shaft, and between the disc 30 and the driving member 9a is mounted an expansive coil spring 32, which tends to force the driving and driven members apart when the engaging mechanism is released, and prevents the clutch from "sticking" or "dragging".

Bolts 9j are provided on the driving member which move in slots 9k in the friction shoe 9g, and in a projection 9h on the inner side of the friction-band 9e, respectively, which serve as guides therefor.

In operation, when the two clutch members are forced together, the friction shoe 9g will engage and ride down the transversely slanting side 9p of the annular groove 9o and force the friction-band 9e against the outer side 9q of the said groove, and the shoe 9g tends to lag with the driven member, thus expanding the friction-band 9e until the clutch mechanism is engaged.

For example, the driving member 9a, being driven in a clockwise direction as indicated by the arrows in Fig. 7, the friction shoe 9g will lag, due to the frictional drag on the grove 9o and move in a relative counter clockwise direction also illustrated by arrows thus forcing the friction band against the side of the groove 9o.

In Figs. 8 and 9 is shown my clutching mechanism adapted to be operated by a radial rod 40 slidably mounted in a slot 41 in a block 42 which is fixed to the driving member 10a as at 44.

A sliding collar 45 about the shaft 50 is provided with a sloping surface 51 against which the rod 40 bears and as the collar 45 is forced against the said rod by any suitable means, the rod will be forced radially outward. The outer end of the rod 40 is provided with a stud 52 which is arranged in a slot 53 in an arm 54. The arm 54 is fixed on a transverse pin 56 which is pivotally mounted in the driving member 10a and on the other end of which is fixed an elliptical cam 55 which is located between the friction shoe 10g and the friction-band 10e, the friction shoe 10g being movably bolted as at 57 to the free end of the said friction band 10e.

In operation as the radial rod 40 is forced outward, the arm will rotate the elliptical cam 55, which will then take the position shown in the full lines in Fig. 9, and thus force the friction shoe and friction-band against the faces 10p and 10q of the annular groove, creating a frictional drag between the friction-band 10e and the side 10q of the groove 10o and as the free end of the friction-band tends to lag with the driven member, a circumferential drag is set up by the friction-band until engagement of the clutch members is attained.

I claim:

1. In combination, a shaft, two motion transmitting members mounted thereon, one side of one of said members provided with a recess concentric with the axis of the shaft, a friction-band secured at one end to the other member and arranged along one wall of said recess, normally disengaged therefrom, the free end of said friction-band provided with a friction shoe located in said recess for engagement with another wall of said recess, whereby when said friction-shoe is engaged, the friction-band is placed in engagement with the recess wall along which it lies.

2. In combination, a shaft, two motion transmitting members mounted thereon, one side of one of said members provided with a recess concentric with the axis of the shaft and of conical cross-section, a friction-band secured at one end to the other member and arranged along one wall of said recess, normally disengaged therefrom, the free end of said friction-band provided with a friction shoe located in said recess conforming with the cross-section thereof, for engagement with another wall of said recess, and whereby when said friction-shoe is engaged, the friction-band is placed in engagement with the recess wall along which it lies.

3. In combination, a shaft, two motion transmitting members mounted thereon, one side of one of said members provided with a recess concentric with the axis of the shaft, a friction-band secured at one end to the other member and arranged along one wall of said recess, normally disengaged therefrom, the free end and intermediate sections of said friction-band provided with friction shoes located in said recess for engagement with another wall of said recess, whereby when said friction shoes are engaged, the friction-band is placed in engagement with the recess wall along which it lies.

4. In combination, a shaft, two motion transmitting members mounted thereon, one side of one of said members provided with a recess concentric with the axis of the shaft and of conical cross-section, a friction-band secured at one end to the other member and arranged along one wall of said recess, normally disengaged therefrom, the free end and intermediate sections of said friction-band provided with friction shoes located in said recess conforming with the cross-section thereof for engagement with another wall of said recess, whereby when said friction-shoes are engaged, the friction-band is placed in engagement with the recess wall along which it lies.

5. In combination, a shaft, two motion transmitting members mounted thereon, one side of one of said members provided with a recess concentric with the axis of the shaft, a friction-band secured at one end to the other member and arranged along one wall of said recess, normally disengaged therefrom, the free end of said friction-band provided with a friction shoe located in said recess, for engagement with another wall of said recess, whereby when said friction shoe is engaged, the friction-band is placed in engagement with the recess wall along which it lies.

6. In combination, a shaft, two motion transmitting members mounted thereon, one side of one of said members provided with a recess concentric with the axis of the shaft, and of conical cross-section, a friction-band secured at one end to the other member and arranged along one wall of said recess, normally disengaged therefrom, the free end of said friction-band provided with a friction shoe located in said recess conforming with the cross-section thereof, for engagement with another wall of said recess, and whereby when said friction-shoe is engaged, the friction-band is placed in engagement with the recess wall along which it lies.

7. In combination, a shaft, two motion transmitting members mounted thereon, one of said members provided with two annular lateral surfaces, sloping one relatively to the other, concentric with the axis of the shaft, a friction band secured at one end to the other member and arranged along one of said surfaces normally disengaged therefrom, the free end of said friction band provided with a friction shoe located along one of said surfaces for engagement therewith, whereby when said motion transmitting members are moved together the said friction shoe becomes engaged and the said friction band is caused to become more and more firmly engaged with said annular lateral surface about which it lies.

ARTHUR M. MEARS.